(12) United States Patent
Klamer et al.

(10) Patent No.: US 6,462,697 B1
(45) Date of Patent: Oct. 8, 2002

(54) SYSTEM AND METHOD FOR CLASSIFYING AND TRACKING AIRCRAFT VEHICLES ON THE GROUNDS OF AN AIRPORT

(75) Inventors: Dale M. Klamer, Oliverhain, CA (US); Donald K. Owen, San Diego, CA (US)

(73) Assignee: Orincon Technologies, Inc., San Diego, CA (US)

( * ) Notice: Subject to any disclaimer, the term of this patent is extended or adjusted under 35 U.S.C. 154(b) by 0 days.

(21) Appl. No.: 09/623,357

(22) PCT Filed: Dec. 29, 1998

(86) PCT No.: PCT/US98/27706

§ 371 (c)(1),
(2), (4) Date: Aug. 30, 2000

(87) PCT Pub. No.: WO99/35630

PCT Pub. Date: Jul. 15, 1999

Related U.S. Application Data (60) Provisional application No. 60/072,387, filed on Jan. 9, 1998.

(51) Int. Cl.⁷ ................................................. G08G 5/00
(52) U.S. Cl. ........................... 342/36; 342/29; 342/176; 342/195; 340/933; 340/935; 340/936; 340/941; 340/945
(58) Field of Search .............................. 342/29–40, 175, 342/195, 176–186; 340/901, 902, 903, 904, 905, 907, 933–943, 945, 947, 948–980

(56) References Cited

U.S. PATENT DOCUMENTS

| | | | | |
|---|---|---|---|---|
| 3,872,474 A | * | 3/1975 | Levine | 342/36 |
| 4,060,805 A | * | 11/1977 | McComas | 342/38 |
| 4,179,695 A | * | 12/1979 | Levine et al. | 342/37 |
| 4,197,536 A | * | 4/1980 | Levine | 342/37 |
| 4,418,349 A | * | 11/1983 | Hofgen et al. | 342/37 |
| 5,321,615 A | | 6/1994 | Frisbie et al. | |
| 5,400,031 A | * | 3/1995 | Fitts | 342/36 |
| 5,448,243 A | * | 9/1995 | Bethke et al. | 342/29 X |
| 5,548,515 A | * | 8/1996 | Pilley et al. | 342/36 X |
| 5,574,648 A | * | 11/1996 | Pilley | 342/36 X |
| 5,629,691 A | * | 5/1997 | Jain | 342/36 X |
| 5,689,273 A | | 11/1997 | Bailey et al. | |

FOREIGN PATENT DOCUMENTS

WO     WO 95/28693     10/1995

OTHER PUBLICATIONS

Search Report for PCT/US98/27706.

* cited by examiner

Primary Examiner—Bernarr E. Gregory
(74) Attorney, Agent, or Firm—Gray Cary Ware & Freidenrich (57) ABSTRACT

A system and method for classifying and tracking aircraft and ground vehicles on the grounds of an airport is provided. The system generates a signal as a vehicle passes over a sensor under the taxiways or runways and analyzes the signal to determine a signature for the vehicle and the estimated speed of the vehicle. The determined signature and estimated speed may be used to track the movement of the vehicle around the grounds of the airport.

17 Claims, 6 Drawing Sheets

SYSTEM AND METHOD FOR CLASSIFYING AND TRACKING AIRCRAFT VEHICLES ON THE GROUNDS OF AN AIRPORT

This application claims the benefit of provisional application No. 60/072,387, filed Jan. 9, 1998.

BACKGROUND OF THE INVENTION

This invention relates generally to a system and method for tracking vehicles, such as aircraft or ground transportation vehicles, on the ground and in particular to a system and method for classifying and tracking aircraft or other vehicles while on the grounds of an airport.

It is desirable to be able to track aircraft both while in the air and on the ground in order to prevent collisions between the aircraft either in the air or on the ground. It is well known that aircraft are tracked while they are in the air by air traffic controllers using radar. These systems effectively track the aircraft while in the air and ensure that aircraft do not collide during flight. However, these radar systems cannot be easily used to track aircraft on the ground because radar is typically mounted on the ground and radiates its energy upwards. Thus, another system for tracking aircraft while on the ground is needed.

It is also desirable to be able to track the aircraft or other vehicles while the aircraft and the vehicles are on the ground at the airport since many collisions and accidents occur while the aircraft is taxing, landing or taking off. In particular, an aircraft is more vulnerable while on the ground since the radar cannot help prevent collisions with other aircraft and there are also ground transportation vehicles which can collide with the aircraft. One conventional system for guiding aircraft already equipped with Instrument Landing Systems (ILS) along taxiways uses two inductive loops installed on the right half and left half of the taxiway. Each inductive loop is driven at a different frequency so that a sensor mounted within the aircraft detects the composite magnetic field induced by the inductive loops and supplies the resultant signal to the ILS system to provide right/left guidance instructions to the pilot of the aircraft through the ILS system. In addition, a dipole marker antenna is embedded in the runway or taxiway and transmits a signal with a unique identifier so that the existing ILS equipment in the aircraft can detect the unique identifier and send information to an air traffic controller (ATC) facility which can determine the position of the aircraft. This conventional system is expensive because it requires both an inductive loop for guiding the aircraft as well as a dipole antenna for determining the position of the aircraft. In addition, this conventional system can not automatically track a plane without communication between the aircraft and the air traffic controllers (ATCs) and cannot automatically determine the type of the aircraft. This conventional system also requires a typical ILS system on board the airplane in order to track and guide the aircraft. This is especially a problem for smaller aircraft that may not have the ILS equipment installed since it is not required for the smaller aircraft. This system also requires that some equipment is added to the aircraft which means that only aircraft which have been appropriately modified may be used with the system.

It is also known that automobiles may be classified using a conventional inductive loop system. This system may also be able to determine the type of automobile passing over the inductive loop as well as the approximate speed of the automobile. This system, however, cannot be used to track and classify aircraft as well as other vehicles since a different technique to classify aircraft as opposed to automobiles is necessary and this conventional system does not actually attempt to track the automobiles as the automobiles travel along the road.

Thus, there is a need for system and method for classifying and tracking aircraft or other vehicles on the ground of an airport which avoid these and other problems of known systems and methods, and it is to this end that the present invention is directed.

SUMMARY OF THE INVENTION

The invention provides a system for classifying and tracking aircraft and ground vehicles on the grounds of an airport which can provide an air traffic controller with knowledge of where each aircraft or vehicle is on the runway or taxiway surfaces in any weather conditions. In addition, the system may combine other existing sensors, such as air surveillance radar into the system to provide an integrated system with air and ground coverage. The system may also alert an air traffic controller (ATC) when a potential collision between ground objects may occur.

The system, due to the classification of the aircraft, can provide a departure queue for the ATCs with safety intervals between the aircraft. Using existing data about each aircraft, such as the airline and flight number, an aircraft being tracked may have legends associated with it indicating the airline and the flight number. The system with the inductive loop sensors is less expensive than a conventional system. The system may also be integrated with air radar to provide an air and ground tracking system. The system may also be scaled up as an airport expands in size because additional sensors are added underneath the additional runways and taxiways.

The system operates in all weather and visibility conditions and is very reliable since the system automatically checks its functioning, reports any malfunctions to an operator, and there are no moving parts in the system to wear out. The system also may be installed rapidly. For example, on new runways, the sensors are embedded directly into the surface paving material. The system may also be quickly integrated into the airport's existing air traffic control system. In addition, since the system has a plurality of inductive loop sensors connected to distributed sensor electronics units, there is no single point of failure as exists with conventional complex radar systems. The portion of the system located near the runways and taxiways is sealed within a weatherproof enclosure which may be powered by solar cells or by direct power (AC or DC).

In accordance with the invention, a system for classifying and tracking vehicles on the grounds of an airport, the airport having at least one runway and at least one taxiway, is provided. The system comprises one or more sensors positioned at predetermined locations adjacent the runway and the taxiway to generate a signal when a vehicle passes near a particular sensor, means for selecting one of a predetermined number of classifications for the vehicle passing over the particular sensor based on the signal generated by the particular sensor, means for determining the position of the vehicle having the selected classification over the grounds of the airport as the vehicle passes over the one or more sensors, and means for displaying a representation of the vehicle on the grounds of the airport, the representation of the vehicle indicating the selected classification of the vehicle and the position of the vehicle on the grounds of the airport.

DETAILED DESCRIPTION OF A PREFERRED EMBODIMENT

The invention is particularly applicable to a system and method for classifying and tracking aircraft on the grounds of an airport. It is in this context that the invention will be described. It will be appreciated, however, that the system and method in accordance with the invention has greater utility. For example, the system may also track and classify ground based vehicles on the grounds of an airport.

Figure 1:
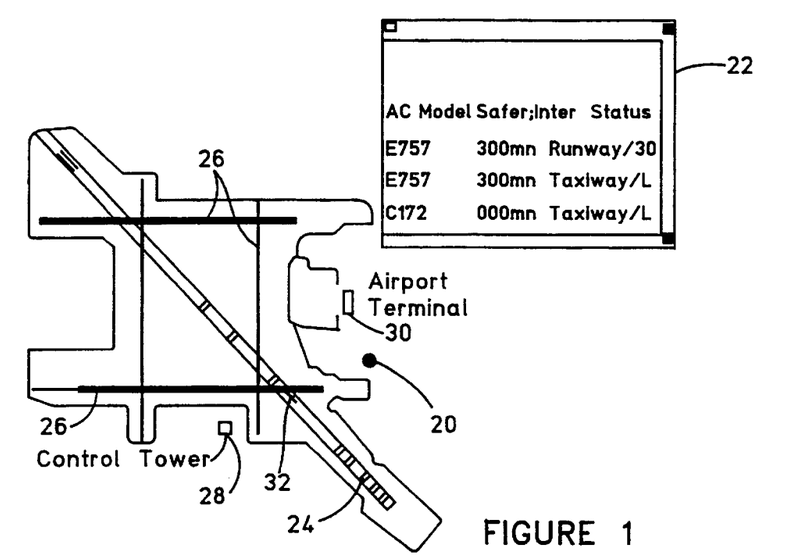
FIG. 1 is a diagram illustrating the layout of a typical airport being displayed on an aircraft classification and tracking system in accordance with the invention.

FIG. 1 is a diagram illustrating an example of a simple layout of a small airport 20 and a departure queue 22 being displayed on an aircraft classification and tracking system in accordance with the invention. The invention may be scaled up to handle any sized airport. In the example shown, the airport has a main runway 24 and one or more taxiways 26, a control tower 28 and a terminal 30. The departure queue shown in this example has three aircraft being tracked including a Boeing 757 (B757) 32 which is on the runway, a Boeing 747 (B747) on a taxiway and a Cesna 172 (C172) which is also on the taxiway. As the B757 32 takes off from the runway, the B747 will move onto the runway and the departure queue will be automatically updated in accordance with the invention, as described below. In addition, in accordance with the invention, the type of the aircraft, such as the Boeing 747, Boeing 757 or the Cessna 172, may be automatically determined by the system in accordance with the invention without any communication with the aircraft, as described below. In addition, the tracking and classification of the aircraft occurs without any additional equipment on the aircraft so that the system may be used with any aircraft and does not require specially modified aircraft. Now, the aircraft classification and tracking system in accordance with the invention will be described.

Figure 2:
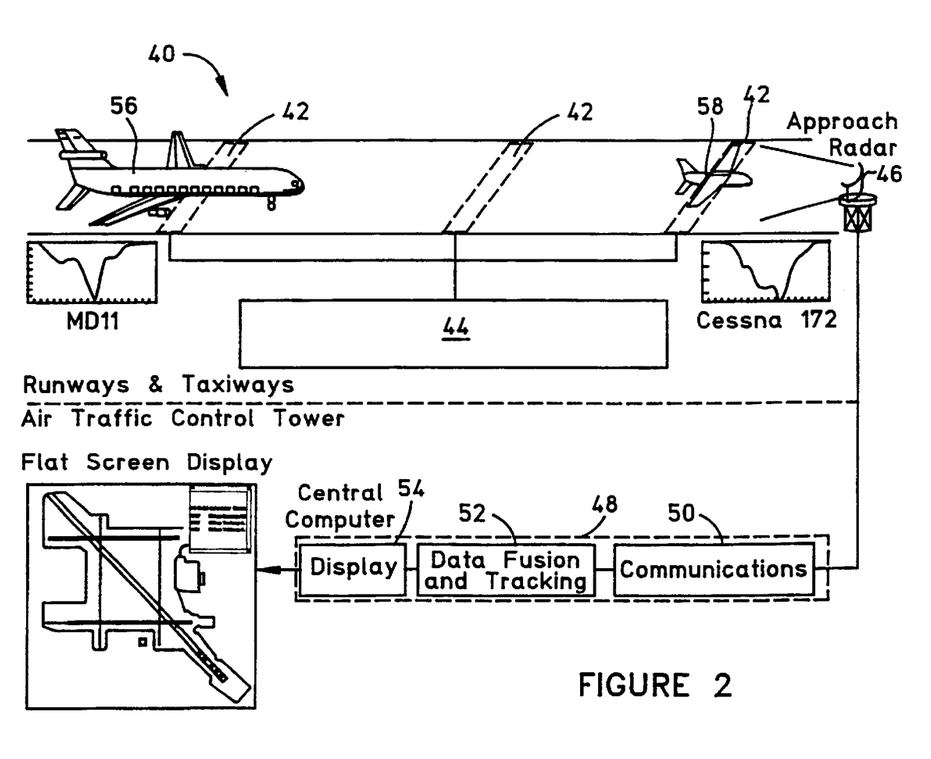
FIG. 2 is a block diagram illustrating the system for aircraft classification and tracking in accordance with the invention.

FIG. 2 is a diagram illustrating an aircraft classification and tracking system 40 in accordance with the invention. The system 40 may include one or more inductive loop sensors 42 that are positioned at various points underneath the runways and taxiways of the airport. For new airports, the inductive loop sensors may be embedded directly into the paving material of the runways and taxiways during the construction of the airport. The one or more inductive loop sensors are connected to a sensor electronics unit 44 which detect aircraft and other vehicles that pass over the various inductive loop sensors and also determines the type of the aircraft and vehicles (i.e., classifies the aircraft and vehicles) that pass over the inductive loop sensors, as described below. The output of the sensor electronics may be combined with a signal from an approach radar 46 and communicated to a central computer 48 that may be located within the air traffic control tower of the airport.

The central computer 48 may include a communications system 50, a data fusion and tracking system 52 and a display unit 54. The output of the display unit, as shown above in FIG. 1, is shown in this diagram also. The communications system 50 receives the signals from the sensor electronics and approach radar and processes them, as described below. The data fusion and tracking system takes information generated by the one or more inductive loop sensors and any other inputs, such as an approach radar, and then generates tracking information for aircraft and vehicles on the runways and taxiways of the airport. For example, based on the classifications made by more than one of the inductive loops sensors, the data fusion and tracking system may determine that the information from each of these inductive loop sensors refer to the same aircraft and then fuse the various data into a single data record regarding that aircraft. Thus, the data fusion and tracking system associates inductive loop sensor data about the same aircraft together. The data fusion and tracking system may also have incursion logic to alert a user of the system to a potential collision. The data fusion and tracking system will be described in more detail with reference to FIGS. 9 and 10. The display unit displays the results of the data fusion and tracking system as shown in more detail in FIG. 1.

The operation of the aircraft classification and tracking system will now be briefly described. As shown in FIG. 2, as an aircraft, such as a McDonnell Douglas L1011 (MD11) 56 or a Cessna 172 58, passes over an inductive loop sensor 42, the inductive loop sensor generates a signal, as described below. This signal, as shown in FIG. 2, is fairly unique for each type of aircraft since each type of aircraft has a different size and profile. These signals from the inductive loop sensors may be used to determine the type of aircraft and the estimated speed of the aircraft passing over the inductive loop sensor. The information about the type of aircraft and the position of the inductive loop sensor may then be communicated to the central computer which fuses the various data from the plurality of inductive loop sensors and generates tracking information about the aircraft or vehicles on the grounds of the airport. The central computer associates all of the inductive loop sensor data about a particular aircraft or vehicle together since each inductive loop generates a unique signal for each type of aircraft. Now, more details of the aircraft classification and tracking system in accordance with the invention will be described.

Figure 3:
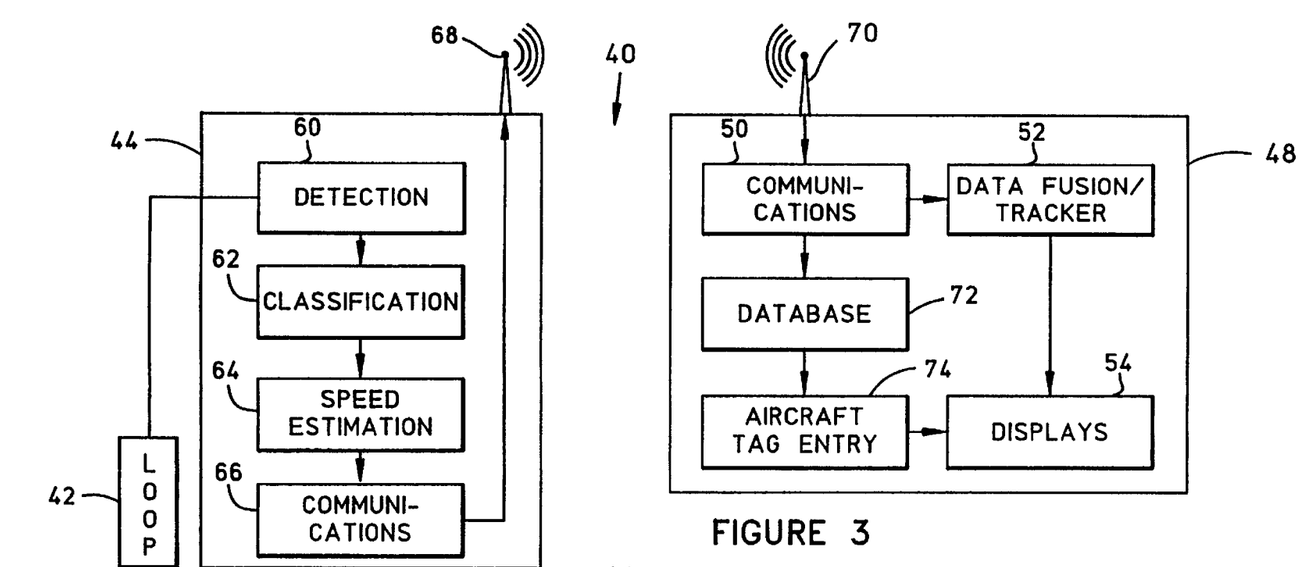
FIG. 3 is a block diagram illustrating more details of the system for aircraft classification and tracking shown in FIG. 2.

FIG. 3 is a block diagram illustrating more details of the aircraft classification and tracking system 40 in accordance with the invention. The plurality of inductive loop sensors 42 are connected to the sensor electronics 44 located near the runways and taxiways. The sensor electronics may be partially solar powered and may be enclosed in a waterproof enclosure. The sensor electronics 44 may include a detector 60, a classifier 62, a speed estimator 64, a communicator system 66 and an antenna 68 to transmit the generated data. The data generated by the sensor electronics may also be transmitted to the central computer over a wire communications line, such as a telephone line. As described below, several portions of the sensor electronics may be implemented as software applications that are being executed by a processor in the sensor electronics or as hardware circuits. The detector 60 detects the crossing of an aircraft or vehicle over one of the inductive loop sensors and generates a signal when the crossing occurs. The classifier 62, based on the signal generated by the inductive loop sensor, determines the type of aircraft to which the signal is most similar (i.e., classifies the signal into a type of aircraft or vehicle). The speed estimator 64, based on the signal from the inductive loop sensor, determines the approximate speed of the aircraft or vehicle passing over the inductive loop sensor. The communicator 66, using the antenna 68 or a wire communications link as described above, transmits the inductive loop signal, the determined classification (i.e., the type of aircraft), the estimated speed and any other information generated by the inductive loop sensor or the sensor electronics to the central computer 48.

The central computer, which may be located at the air traffic control tower, may include the communicator 50, the data fusion/tracker 52, the display 54, an antenna 70, a database 72 and an aircraft tag entry database 74. The central computer may also receive data from the sensor electronics over a wire communications line, such as a telephone line. The communicator 50, using the antenna 70, receives the data from the sensor electronics 44 and corrects data transmission errors, as described below. A portion of the information in the data received from the sensor electronics may be new signature data from the sensor electronics. The database 72 may be a signature database which contains any known type signature data, any tracking data generated by the central computer, and any other data relevant to the fusing of the data or the tracking of the aircraft or vehicles on the grounds of the airport. The data fusion/tracker 52 correlates incoming classification data from the sensor electronics to its currently existing aircraft(s) and vehicle(s) in the database 72 to determine if the data from that inductive loop sensor corresponds to an already existing aircraft or vehicle. The data fusion/tracker may also update any tracking records based on the incoming inductive loop sensor data and generate the necessary data to display the appropriate updated airport layout, as shown in FIG. 1, in response to the incoming inductive sensor data. Thus, the display 54 is updated constantly as new inductive loop sensor data is received so that the air traffic controllers are constantly and automatically updated about the movement of aircraft or vehicles on the grounds of the airport. The aircraft tag entry database 74, which is generated based on data from the approach radar, permits the display to associate an aircraft tag, which identifies the particular aircraft by its airline and flight number, with the tracking information being generated by the data fusion/tracker. Thus, the display may show an icon, with its aircraft or vehicle tag information, at the appropriate location of that aircraft or vehicle on the grounds of the airport. Now, more details of the sensor electronics will be described.

Figure 4:
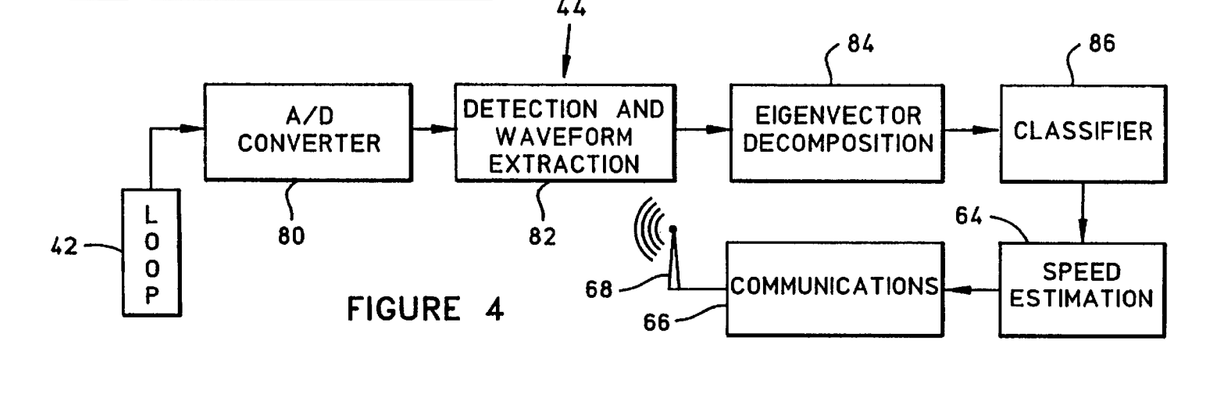
FIG. 4 is a block diagram illustrating the details of the inductive loop system shown in FIG. 3.

FIG. 4 is a diagram illustrating more details of the sensor electronics 44 and the loop 42. The sensor electronics 44 may include an analog-to-digital (A/D) converter 80, a detection and waveform extractor 82, an eigenvector decomposition system 84, a classifier 86, the speed estimator 64, the communicator 66 and the antenna 68. The sensor electronics may be implemented, for example, as a plurality of software applications being executed by a digital signal processor, such as a Motorola DSP 56002. The classifier 86 may be one of several types of classifiers, such as multilayer perceptron neural networks, basis function neural networks or classical classifiers.

Each loop 42 generates a varying inductance value. When nothing is passing over a particular loop, a steady or slowly varying inductance is measured. The slowly varying inductance when nothing is passing over the loop may be caused by variations in electrical components due to temperature, by variations in the moisture content of the ground in which the loop is embedded which causes electrical conductivity of the ground to change, or by variations in the temperature of the air which causes the dielectric constant of the air to change. As described below with reference to FIG. 5, the variance of the inductance may be accounted for by using an exponential filter.

The detection software 82 detects an occurrence of a transient signal from an inductive loop sensor indicating a passage of an aircraft or a ground vehicle over the inductive loop. The transient signal is generated as the nose of an aircraft or the front of a vehicle passes over the loop and continues to be generated until the tail of the aircraft or the back of the vehicle has passed over the loop. The inductance of the loop is decreased when an aircraft or vehicle passes over the loop. The transient signal will be described below with reference to FIGS. 5 and 6.

The A/D converter 80 then converts the analog transient loop signal into digital samples and the detection and waveform extractor 82 uses the digital samples to generate a signal which is linearly related to the inductance of the loop, as described below. The transient signal is detected as a change in the inductance from a background average value. The detection and waveform extractor then extracts a representation of a temporal waveform of the signal. To facilitate further signal processing, the temporal waveform is resampled into a fixed number of samples, regardless of the time that it takes for the aircraft or vehicle to cross a particular loop. The actual time required for the aircraft or vehicle to cross the loop is determined so the speed of the aircraft or vehicle may be estimated by the speed estimator 64. The eigenvector decomposition system 84 and the classifier 86 use the temporal waveform to determine the type of the aircraft or vehicle based on the waveform, as described below with reference to FIG. 5. The classification and the speed estimation information for a particular crossing of an inductive loop may then be transmitted to the central computer by any conventional communications system, such as a spread spectrum radio communications system or a wire communications line. Now, more details about the detection and classification of the temporal waveform will be described.

Figure 5:
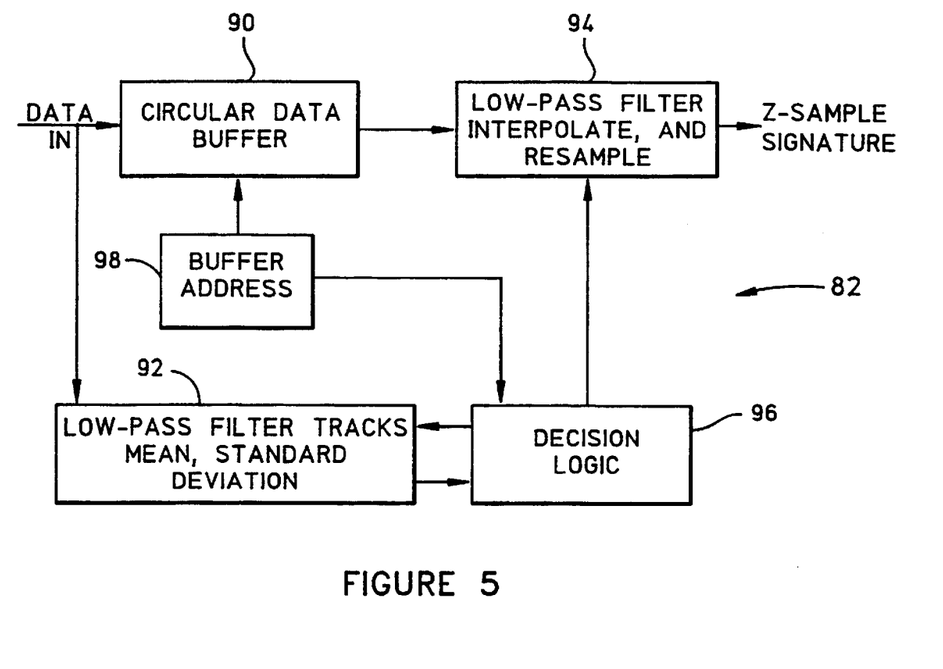
FIG. 5 is a block diagram illustrating more details of the detection and waveform extraction portion of the system shown in FIG. 4.
Figure 6:
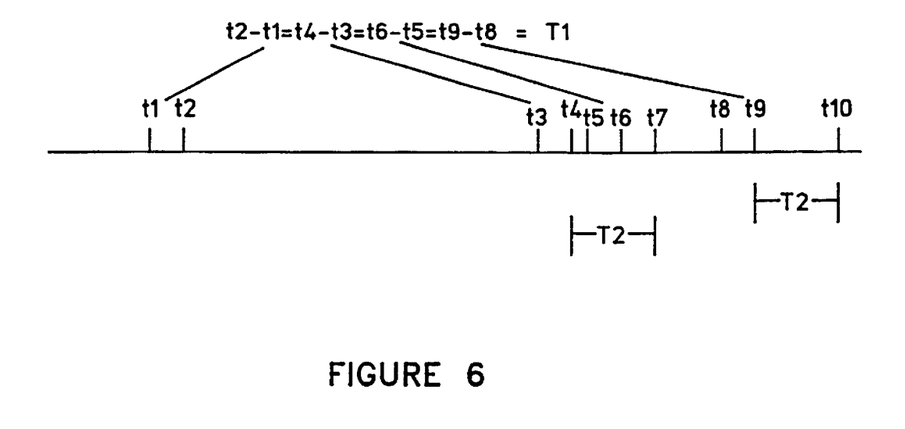
FIG. 6 is a diagram illustrating an example of the signal detecting in accordance with the invention.

FIGS. 5 and 6 illustrate more details about the detection and waveform extractor 82 and an example of the detected waveform, respectively. As shown in FIG. 5, the detection and waveform extractor may include a circular data buffer 90, a low pass filter 92, a second low pass filter, interpolator and resampler 94, a decision logic unit 96 and a buffer addresser 98. The signals representing the change in the inductance of the various inductive loops are fed into the circular data buffer 90. The low pass filter 92 tracks the variations in the inductance of the loops caused by non-events, such as changes in the temperature of the air, changes in the water content of the ground and the like as described above, and generates a background inductance level which is used as a threshold value for the detection of an actual aircraft or vehicle passing over an inductive loop.

When a change in the inductance is a significant deviation from the background inductance level and lasts for a predetermined amount of time, this marks the beginning of something passing over an inductive loop. The magnitude of the deviation sufficient to trigger a crossing detection depends on the current value of the background inductance which changes as the inductance of the inductive loop change, as described above. The decision logic 96 determines when the background threshold is exceeded and then the buffer addressor 98 saves the address of the beginning of the waveform once the threshold is exceeded. When the signal from the inductive loop goes below the threshold, the buffer addressor saves this address as the possible end of the waveform. If the signal then stays below the threshold for a predetermined amount of time, such as T2, as shown in FIG. 6, then an end of the waveform is indicated. On the other hand, if the signal again exceeds the background threshold in some time less than T2, then the end of the signal is not set until the signal stays below the threshold for at least the predetermined time, T2.

The waveforms extracted in this manner have varying durations depending on the speed of the aircraft or vehicle over the inductive loop. In order to facilitate the classifications of these signals, each measured signal is resampled by the resampler 94 so that each signal output from the detection and waveform extractor 82 has the same number of samples. For example, in a preferred embodiment, each signal captured which exceeds the threshold is resampled into a fixed number, z, of uniformly spaced time samples and the time duration of the original signal is saved in order to estimate the speed of the aircraft or vehicle.

In addition to aircraft or vehicle which pass completely over an inductive loop, the system must also handle the situation where the aircraft or vehicle stops on top of an inductive loop. Thus, when an aircraft or vehicle stops over an inductive loop, the inductance of the inductive loop decreases to a lower value and stays constant as long as the object does not move. In this case, the detection and waveform extractor 82 detects that the aircraft or vehicle has stopped over the loop since the inductance is lower than the background threshold and has a constant value for a predetermined amount of time, such as several seconds. This information may be communicated to the central computer which then displays a representation of the vehicle or aircraft over the particular inductive loop. An example of a signal captured by the detection and waveform extractor 82 will now be described.

FIG. 6 illustrates an example of the signal captured by the detection and waveform extractor in accordance with the invention. The actions of the detection and waveform extractor during a time period, from t1 to t10, will now be described. Before time t1, the background threshold is tracked to determine the background threshold inductance signal. From t1 to t2, a duration of time T1 seconds occurs in which the input signal exceeds the limit determined by the current value of the background threshold inductance signal. Therefore, the probable start of something passing over an inductive loop is indicated and the address of the circular buffer at time t1 is stored as the likely beginning of the detection. From times t2 to t3, the change in the inductance signal is present and the circular buffer address at t1 is confirmed as indicating the beginning of the detection signal. From t3 to t4, a duration of T1 occurs when the input signal is below the threshold background inductance signal indicating the possible end of the signal. The circular buffer address at t3 is tentatively stored as the end of the detection signal. From t5 to t6, the signal again exceeds the threshold of the background inductance. Since the period of time between the tentative end of the signal and the new signal exceeding the threshold is less than a predetermined amount of time, T2, the new signals are part of the original detection signal and t3 is not the end of the detection signal. From t8 to t9, the signal again drops below the threshold value and the circular buffer address at time t8 is saved as the possible end of the detection signal. After t10, a time duration, T2, has passed with no further signals exceeding the threshold so that t8 is confirmed at the end of the detection signal. This waveform, from t1 to t8 is then passed on to be resampled, classified and then the speed of the vehicle is estimated. Now, the process for classifying an aircraft or vehicle in accordance with the invention will be described.

The waveform generated, as described above, has a fixed number of samples (z dimensions). In order to facilitate the classification process, the waveform may be reduced to fewer samples (dimensions) through an eigenvector decomposition, as described below. By reducing the dimensionality of the data, the memory necessary to store the waveform is reduced and the number of inputs to the classifier is also reduced which reduces the processing required for classification of the waveform. Thus, a smaller, simplified classifier, such as a neural network, may be used to process the waveform and a simplified classifier is faster, requires less memory to implement and runs faster than a more complex classifier. After the dimensionality of the waveform has been reduced, the classifier determines the classification of the aircraft or vehicle that is most likely to have produced the observed waveform and a list of the most likely classification and the associated estimated likelihoods are then sent via the communications system to the data fusion/tracking system in the central computer. The reduction in the size of the waveform will now be described in more detail.

To reduce the size of the waveform vector, a form of principal component analysis is performed in which a two-dimensional matrix C is formed by multiplying the waveform matrix D, where each column of D is a fixed number of samples, M, representation of the waveform. Then, D is a M by N matrix as large as we have collected data signatures for, by its transpose, $C=DD^T$. The normal result of this operation is a covariance matrix. However, D was not normalized and the mean was not subtracted from it. Next, C is subjected to eigenvector decomposition resulting in a set of M element eigenvectors and associated eigenvalues. The eigenvectors constitute a set of orthonormal vectors that span the M-dimensional space occupied by the input data. Therefore, all of the input data can be decomposed into the sums of the eigenvectors. The eigenvalues associated with the eigenvectors give an indication of how much of the variability in the original fixed number of samples waveform can be projected onto the various eigenvectors. In a preferred embodiment, the K largest eigenvectors, where K<M, may be used and provide sufficient resolution of the detected waveform to permit the classification of the waveform.

The classifier software may use a variety of different algorithms for classifying the waveform. One example of a classifier is a modified elliptical basis function (EBF) neural network which does a good job of classifying and may be trained quickly. It should be realized that other types of classifiers may also be used in accordance with the invention. An elliptical basis function neural network is an extension of a radial basis function (RBF) network, but the RBF forms spherical decision boundaries as opposed to elliptical decision boundaries with the EBF. The RBF was originally created for biological systems in which neurons have responses tuned to localized regions of input space. In a usual implementation, the inputs are fed in parallel to a set of neurons, each of which sees only a small portion of the total input space. The outputs of these localized neurons are weighted and summed in a set of network output neurons.

Figure 7:
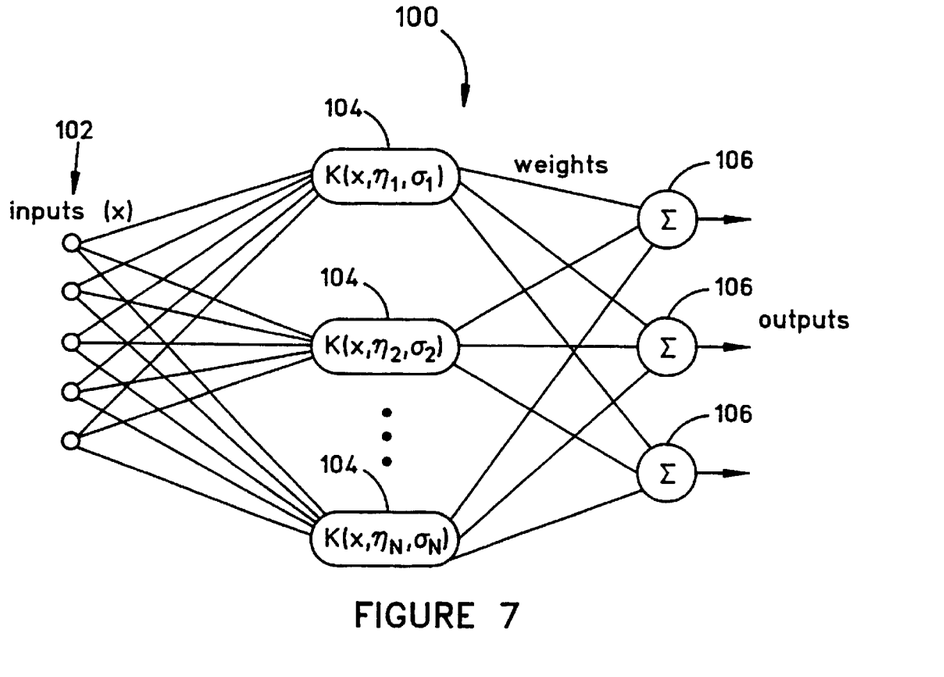
FIG. 7 is a block diagram illustrating an example of a classifier, such as an elliptical basis function network for classifying the aircraft in accordance with the invention.

FIG. 7 illustrates an example of an elliptical basis function (EBF) neural network 100 in which a plurality of inputs 102 are fed in parallel into a plurality of neurons 104 and the results from each of the neurons is fed out in parallel to a plurality of output neurons 106. The input vector, x, has K elements and is the eigenvector computed from the aircraft signature detection. The function in the neurons 104, $K(x, \eta_i, \sigma_i)$ is symmetric about each of the K axes where $\eta_i$ is the mean of the ith eigenvector element for a single class of aircraft and $\sigma_i$ is the standard deviation of the ith eigenvector element for that same aircraft type. For the invention, the index i is between 1 and L since there are L different types of aircraft and vehicles that may be identified. The values of $\eta_i$ and $\sigma_i$ for each type of aircraft and vehicle are calculated from a database of collected signatures for each aircraft or vehicle. A large number of actual readings for a particular aircraft or vehicle, which constitutes a training for the neural network, increases the confidence that few aircraft of each type have an eigenvector outside of $3\sigma$.

An example of the actual implementation of the EBF classifier will now be provided for illustration purposes. A typical EBF is simplified to form a hyperelliptical classifier by removing some weights in the output layer. Each of the basis function neurons 104 has a response to a region of the input space that contains input from only one or at most only a small number of aircraft or vehicle classes, depending on the way that the input vector clusters various classes of similar aircraft may overlap. This may be determined through normal training procedures. The weights for a link between a basis function neuron 104 and an output neuron 106 representing a class with a cluster center far from the center of the activation region evolve to a small value. At the end of the training, output weights that have small values are removed which reduces the number of connections in the network and results in a sparsely connected output layer.

To develop this basis function classifier, it was assumed that each cluster has a Gaussian distribution when projected onto each of its K axes and that the positions of the projections of the input vectors onto the different axes are independent. The second assumption eliminates the need to store a K by K covariance matrix for each basis function. These assumptions restrict the axes of the hyperellipses that define the activation regions to be parallel to the signal eigenvector axes which increases the probability of the overlap of the activation regions for different aircraft classes. Once sufficient data has been collected, the values of the vectors $\eta_i$ and $\sigma_i$ can be obtained for each aircraft or vehicle class. When an input vector is presented to the classifier, the square of a kind of hyperellipsoidal distance, Y, between this input vector and each of the cluster centers is calculated as:

$$Y \equiv \sum_{l=1}^{K} \frac{(xl - \eta_l)^2}{\sigma_l^2}$$

From the assumption of the independent Gaussian distributions for the various values of $x_i$, we assume that Y has a chi-squared probability density function for n=K degrees of freedom so that:

$$f_Y(Y) = \frac{Y^{\frac{(n-2)}{2}}\left(e^{\frac{-Y}{2}}\right)}{2^{\frac{n}{2}}\Gamma(\frac{n}{2})}$$

For each basis function, we calculate a value $Y_j$, then integrate the density function above from $Y_j$ to infinity. This provides a number that may be treated as a probability that, given an input vector representing class j, the calculated value of $Y_j$ would be equal to or greater than $Y_j$. This is then the activation function for each basis function neurons:

$$K(x, \eta_i, \sigma_i) = P(Y > Y_j | H_j) = P(B_j | H_j)$$

Figure 8:
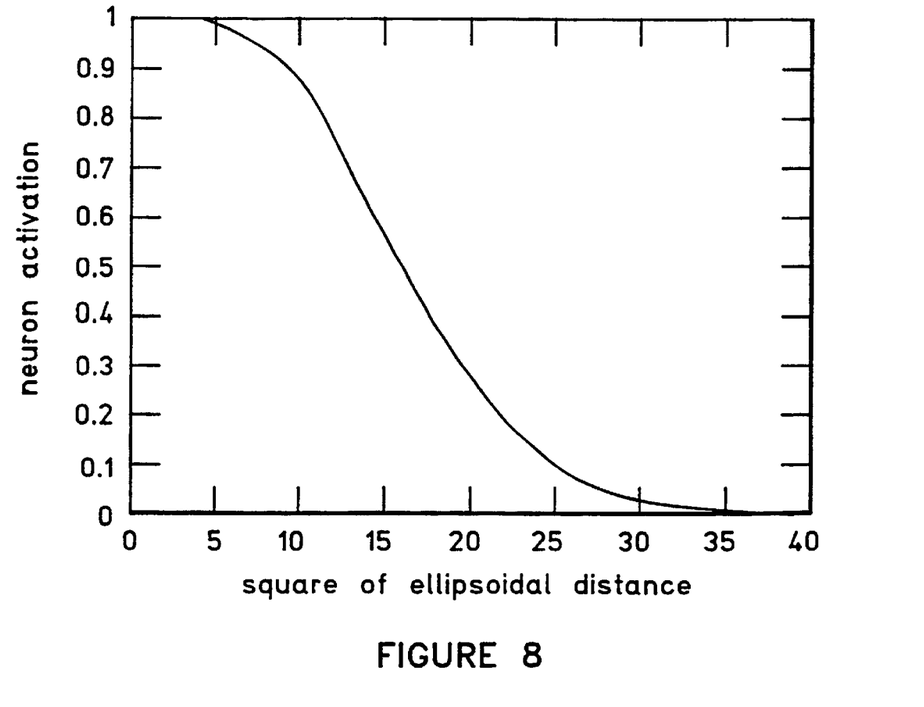
FIG. 8 is a block diagram illustrating an example of the activation function for the elliptical basis function network type of classifier of FIG. 7.

FIG. 8 shows a plot of the activation function above. It is possible to numerically integrate the appropriate function to calculate $K(x, \eta_i, \sigma_i)$ for each basis function neuron each time an input vector is presented to be classified, which requires some extra processing code and computation time. In view of the visual similarity of this activation function to a hyperbolic tangent function that is normally used for a feed-forward multilayer perceptron activation functions, it was found that an approximation to $K(x, \eta_i, \sigma_i)$ could be obtained using only two hyperbolic tangents that had a root mean square discrepancy with $K(x, \eta_i, \sigma_i)$ of only 0.002 over the interval from 0 to 50. This approximator has the advantage of little code space to implement and less computation time. Therefore, to compute the probability that the aircraft or vehicle that generated the waveform was of class j, given $B_j$, from the basis function neuron j, using Bayes' theorem so that:

$$P(H_j | \beta_j) = \frac{p(\beta_j | H_j) P(H_j)}{\sum_{k=1}^{N} P(\beta_k | H_k) P(H_k)}$$

The values of $P(H_j)$ are estimated from observed frequencies of the various classes of aircraft or vehicles. One of these values for each possible class is needed.

Some attempt to measure the reliability of this injection vector is needed because the waveform could have been generated by an unusual type of aircraft or possibly a ground vehicle for which no classification has been encoded, or any of many possible events could have occurred to produce some distortion in the waveform. A measure of confidence of the Pearl tree injection vector is also needed. The process above can generate a reasonable injection vector even if the maximum value of $P(\beta_j | H_j)$ is small. For this, we use the largest value of $P(\beta_j | H_j)$ as a measure of the confidence.

Once the most likely classification of the aircraft or vehicle is determined, the speed estimator 64 estimates the speed of the object. In particular, when an aircraft has been classified, its length may be determined using a look-up table. Then, the length of the aircraft is divided by the time required for the aircraft to pass over the loop to determine an estimated speed in feet per second which may be easily converted into knots.

The communications system 66 then transmits any data to the central computer 48. The communications system handles data loss that may occur. Each sensor electronics 44 may be positioned around an airport such that there are a total of, for example, four communications zones which have some overlapping coverage, but quicker communications since there are only four zones. A zone represents a single wire communication line or radio channel depending on whether a wire communications system or a spread spectrum radio communications system, respectively, is used for communicating data between the sensor electronics and the central computer. Each of the sensor electronics 44 may be polled once every predetermined amount of time, such as once every second. During polling the central computer will request any detection data. If there is not any detection data, a "no data" message is sent back to the central computer. If detection data exists, then the signature waveform, its classification, its speed estimate, and any other data is sent to the central computer. An example of the data fields that may be sent to the central computer are listed in the table below.

TABLE 1

| Data Field Name | Size | Description |
| --- | --- | --- |
| Loop_ID | 1 | Loop Number |
| Date | 4 | Date and Time signature was collected |
| Acceleration | 4 | Estimated acceleration of aircraft or vehicle |
| Speed | 4 | Estimated speed of aircraft or vehicle |
| Interval | 2 | Time width of each resampled signature sample |
| Max_Inductance | 2 | Maximum inductance of detection |
| Min_Inductance | 2 | Minimum inductance of detection |
| Original_Length | 2 | Original length of signature prior to resampling |
| Signature | 64 | Signature vector |
| Num_Class | 1 | Number of classifications in list |
| Classification | 4 | Probable classification, size 10 |
| Likelihood | 4 | Likelihood of correct classification, size 10 |

For each message sent to the central computer, a checksum is computed by the sensor electronics, and appended to the end of the message so that the central computer may use the checksum to check the message for errors. If the checksum computed by the central computer is different from the checksum at the end of the message, the central computer requests the retransmission of the last message. Similarly, for messages from the central computer to each of the sensor electronics, the central computer computes a checksum and appends it to the end of the message so each of the sensor electronics may check the message for errors and request retransmission as needed. Any information about an inoperative sensor electronics or loop may be passed to the central computer because the central computer periodically queries each of the sensor electronics to ensure that the loop is properly functioning. Otherwise, the sensor electronics may send a "bad loop" message back to the central computer. Now, the details of the central computer will be described in more detail.

Figure 9:
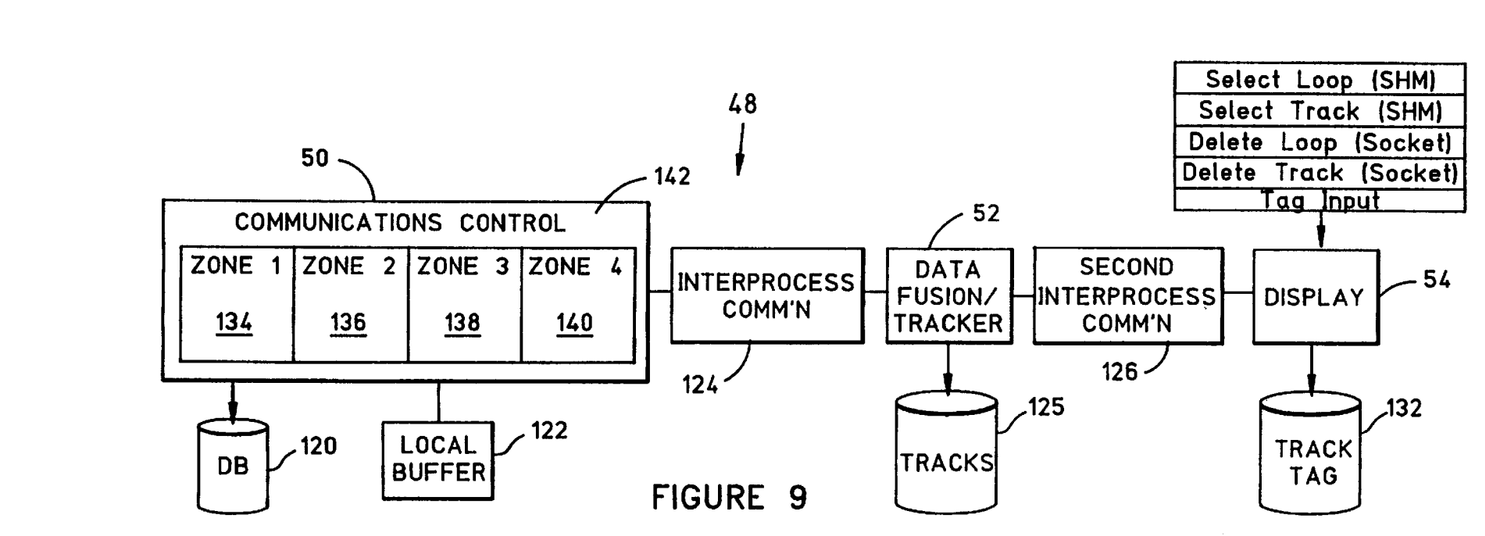
FIG. 9 is a block diagram illustrating more details of the central computer portion of the system of FIG. 3.

FIG. 9 is a diagram illustrating the details of the central computer system 48 in accordance with the invention. The central computer 48 may include the communications system 50, the data fusion/tracking system 52 and the display 54. In addition, the central computer may also include a database 120 and a buffer 122 connected to the communications system 50, an interprocess communications system 124, which may be a socket or some other communications system, connecting the communication system to the data fusion/tracker, a track database 125 connected to the data fusion/tracker, a second interprocess communications system 126, which may be a semaphore, a shared memory (SHM) and a socket combination or some other communications system, connected between the data fusion/tracker and the display, and a tag track database 132 connected to the display 54.

The communications system 50 may be implemented as a software application being executed by a processor in the central computer. The communications system may have five processes. In this example, there may be a communications process 134–140 for each of the communications zones in the airport and one communications control process 142 that receives the data from each of the zone processes. Each zone process 134–140 may receive data from the inductive loops and sensor electronics within the communications zone. The communications system 50 in accordance with the invention may have any number of communications zones and corresponding zone processes depending on the size of the airport. The communications control process 142 initiates the zone communications processes to poll each sensor electronics at a predetermined interval to test the functioning of the sensor electronics and the inductive loop sensors. The communications control process may also collect the detection data from the zone communications process for the current polling pass and initiates the zone communications processes to poll their respective sensor electronics again. The polling of the sensor electronics in each zone may be a continuous process controlled by the communications control process. The communications control process writes the signature and classification detection data to the database 120 for future use and sends aircraft and ground vehicle detection data to the Data Fusion/Tracker 52. The various detection data that may be communicated between the central computer 48 and each sensor electronics 44 is described above.

Each central computer zone process 134–140 communicates with the sensor electronics 44 assigned to the zone and, in each communication with a sensor electronics, requests any detection data. If no aircraft or ground vehicles have passed over the loops connected to the sensor electronics, then a "no data" message is returned to the central computer. If detection data is available, then its signature, classification, speed estimate, and other associated data are sent to the central computer. The communications control process 142 writes the detection data to the database 120. The incoming data may be temporarily stored in the buffer 122 prior to storage in the database 120. Table 2 below identifies an example of the various data field definitions for the database 120 data records in which all aircraft signatures and classification data are stored.

TABLE 2

Database Data Fields

| Name | Size | Description |
| --- | --- | --- |
| Loop_ID | 1 | Loop number |
| Date | 4 | Date & time signature collected |
| Acceleration | 4 | Estimated acceleration |
| Speed | 4 | Estimated speed |
| Interval | 2 | Time width of each resampled signature sample |
| Max_Inductance | 2 | Maximum inductance of detection |
| Min_Inductance | 2 | Minimum inductance of detection |
| Original-Length | 2 | Original length of signature prior to resampling |
| Signature | 64 | Signature vector |
| Num_Class | 1 | Number of classifications in list |
| Classification | 4 | Probable classification, size 10 |
| Likelihood | 4 | Likelihood of correct classification, size 10 |
| IVS-2000_Freq | 2 | Sensor Electronics frequency used to drive loop |
| Sample-Rate | 2 | Sensor Electronics sample rate |
| Flight_Num | 8 | Flight tag number |
| Aircraft_TNum | 10 | Aircraft tail number |
| Truth_Class | 2 | True aircraft classification |
| Truth-Speed | 2 | True aircraft speed |
| Temperature | 2 | Temperature |
| Wind_Vel | 2 | Wind velocity |
| Wind_Dir | 2 | Wind direction |
| Baro_Press | 2 | Barometric pressure |

After the communications control process 142 collects the detection data from each of the zone communication processes 134–140, the detection data is sorted, in time of detection order, and sent to the Data Fusion/Tracker 52.

Table 3 illustrates an example of the definition of the data interface between the communication control process 142 and the Data Fusion/Tracker 52.

TABLE 3

Data Fields Between Communication Process and Data Fusion/Tracker

| Name | Size | Description |
| --- | --- | --- |
| Loop_ID | 4 | Loop number |
| Speed_Flag | 4 | Indicates if the classifier estimated speed is valid |
| Speed | 4 | Speed of detection |
| Num_Class | 4 | Number of classifications which follow |
| Class_Type | 4 | Classification type, up to 10 |
| Class_Prob | 4 | Classification probability, up to 10 |
| Signature | 4 | Signature vector of size 64 |
| Detection Time | 8 | Time detection was made by Sensor Electronics |

Any detection data is sent to the data fusion/tracker process 52 by the communications process 142 via the interprocess communications 124, which may be a socket. There may be six functions that are implemented to handle all the interprocess communications between the communications process 142 and the data fusion/tracker process 52. These functions may include, for example:

initialize_input_interface: Called by the Communications process and the Data Fusion/Tracker process to initialize the interface and allocate a file descriptor for the interprocess communications.

get_input_message_type: Called by either the Communications process or the Data Fusion/Tracker process to determine the particular type of message pending from the other process.

send_input_message: Called by either the Communications process or the Data Fusion/Tracker process to send a message to the other process.

receive-input_message: Called by either the Communications process or the Data Fusion/Tracker process to retrieve the message from the other process.

get_input_file_descriptor: Called by either the Communications process or the Data Fusion/Tracker process to obtain the interface file descriptor for that process for use in the interprocess communications connection.

shutdown_input_interface: Called by the Communications process and the Data Fusion/Tracker process to shut down and close the interface between the Communications process and the Data Fusion/Tracker process.

Now, the data fusion/tracker system 52, which may be a software application being executed by a processor in the central computer 48 is described. In a preferred embodiment, the data fusion/tracker may be a multiple-hypothesis tracker (MHT) software application modified to process aircraft and ground vehicle detections. The Data Fusion/Tracker process 52 accepts detection inputs from the Communications process 142, forms tracks and links new detections to existing tracks, and sends track information to the Display 54. The Display 54 is updated periodically and preferable about once per second. The update rate of the Display 54 is a modifiable parameter that can be set-up at system start-up.

Figure 10:
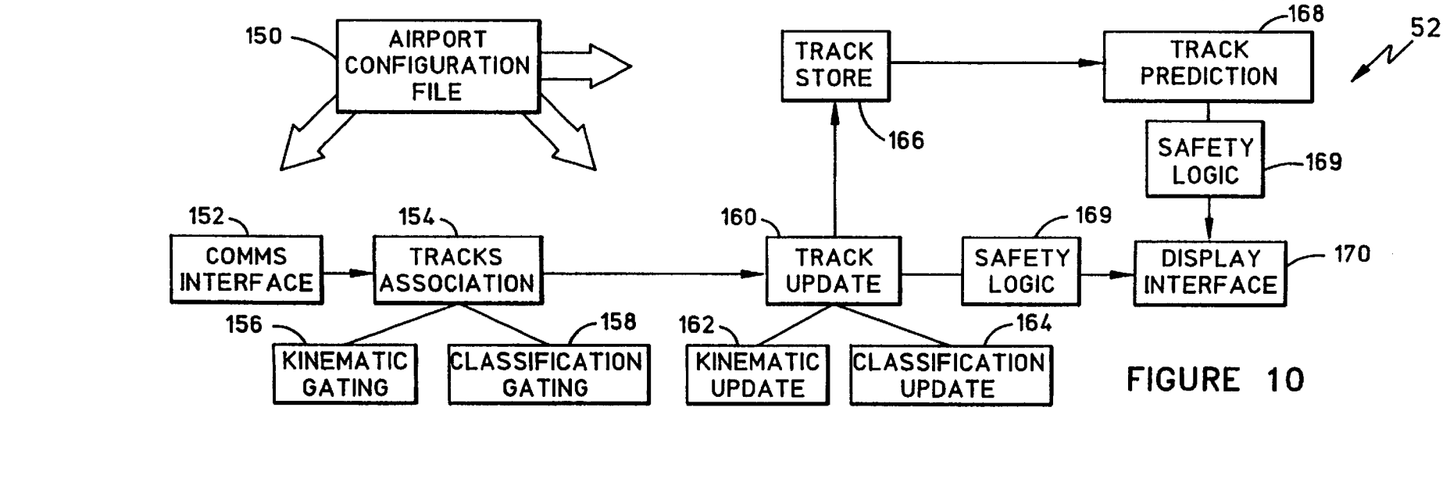
FIG. 10 is a block diagram illustrating more details of the data fusion and tracking portion of the central computer portion shown in FIG. 9.

FIG. 10 illustrates an architecture for the data fusion/tracking process 52 in accordance with the invention. The data fusion/tracking process may include an aircraft configuration file (ACF) 150, a communications interface 152, a track associator 154, a kinematic gator 156 and a classification gator 158 connected to the track associator, a track updater 160, a kinematic updater 162 and a classification updater 164 connected to the track updater, a track store 166, a track predictor 168, safety logic 169 and a display interface 170. The data fusion/tracker process 52 is automatically configured by reading the airport configuration file (ACF) 150. This file contains information about the configuration for each airport in which the system is installed. For example, the file may contain information about the Long Beach Airport. The other functionality within the data fusion/tracker is airport independent and it is only the ACF that needs to be modified when the system is installed at other airports.

The Airport Configuration File (ACF) 150 is read in by the Data Fusion/Tracker process when it starts running. The ACF defines the runways and taxiways in terms of segments. Segments are defined as those sections of runways and taxiways that lie between intersections of the runways and taxiways. The ACF may also define transition rules for transitioning from one segment to another within the airport. The ACF also defines the inductive loop sensor placement in the airport and the distances between each of the inductive loop sensors. As described above, the other data fusion/tracking functionality is independent of any specific Airport Configuration File.

The data fusion/tracker interface 152 to the communications process is event driven. In other words, when an aircraft detection occurs and is received by the central computer, the Data Fusion/Tracker process is automatically notified by the Communications process through the communications interface 152 that may be a UNIX-based socket interface.

The track association process 154 performs testing to determine if any incoming detections can be linked to existing tracks. If not, a new track is created. The track association process 154 uses the definitions in the ACF to apply loop transition tests. Two types of gating of new detections with existing tracks are done: classification gating 158 and kinematic gating 156. The classification gating, for association, uses the Bayesian Pearl tree. In particular, based on classification data from the sensor electronics detection, the probabilities of a particular track being a certain type of aircraft are updated by the Bayesian Pearl tree. Kinematic gating 156, on the other hand, uses Kalman filter innovations. The ranking and ordering of the association probabilities is performed to determine final discrimination for association of a new detection to a track.

The track updating 160 is performed using single-dimension Kalman filter estimates to determine track position and velocity and the Bayesian Pearl tree to integrate, and thus improve, a track's classification of aircraft. The track update process 160 also computes the loop-to-loop acceleration metric, the loop prediction time error metric, and the classification refinement metric (improvement of classification confidence from the first loop detection).

The track prediction 168 may determine the forward prediction of tracks in time and may be accomplished by applying a Kalman filter prediction between track updates. The decision logic in this function uses the ACF to control track prediction at runway and taxiway intersections and at the loops. The data fusion/tracker to Display interface 170 may be implemented using interprocess communications, such as a shared memory and a UNIX socket interface. After any track has been updated, all tracks are predicted forward to the current time and sent to the Display process. The track predict process 168 may occur once every predetermined interval, such as once per second, regardless of whether or not a detection has occurred. This is to present the user a smoothly moving track and to avoid having track positions jump from loop to loop. The operator "drop track" and "drop loop" commands are sent to the data fusion/tracker 52 from the Display via the data fusion/track to Display interprocess communications. An example of the detection data interface and the data fields communicated between the data fusion/tracker process and the display process is shown in Table 4.

TABLE 4

Data Fields Between Data Fusion/Tracker and Display

| Name | Size | Description |
| --- | --- | --- |
| Track_State_Time | 8 | Time of position of track |
| Trk_Display_ID | 4 | Track number |
| Last_loop_ID | 4 | Last loop track detected on |
| X_Offset | 4 | Display X coordinate of position |
| Y_Offset | 4 | Display Y coordinate of position |
| Pre_Track_Flag | 4 | Indicates first detection of track, can not start track with just one detection |
| Course | 4 | Track course |
| Speed | 4 | Track speed |
| Delta_Class_Prob | 4 | Improvement of classification probability from first detection |
| Loop_Predict_Time_Error | 4 | Time error of track being detected at next loop |
| Num_Class | 4 | Number of classifications which follow |
| Class_Type | 4 | Classification type, up to 10 |
| Class_Prob | 4 | Classification probability, up to 10 |
| Signature | 4 | Signature vector of size 64 |

Any detection data is sent to the Display process by the Data Fusion/Tracker process via an interprocess communications system, such as a shared memory. In the example below, four functions may be implemented to handle all communications between the Data Fusion/Tracker process and the Display process, but there may also be additional functions in accordance with the invention:

initialize_display_interface: Called by the Data Fusion/Tracker process and the Display process to initialize a double-buffered shared memory interface between the Data Fusion/Tracker and the Display processes.

send_track_list: Called by the Data Fusion/Tracker process to send a track list to the free buffer of the double-buffered shared memory interface.

receive_track_list: Called by the Display process to check the free shared memory buffer for a new track list from the Data Fusion/Tracker process. If a new track list is available in the free buffer, the return value is set to one and the track list pointer is set to point to the buffer with a new track list. The Display process owns the buffer and the Data Fusion/Tracker process cannot write to that buffer until the Display process requests the next track list. A zero return indicates that the Data Fusion/Tracker process does not have a new track list yet.

shutdown_display_interface: Called by the Data Fusion/Tracker process and the Display process to terminate the interface between the Data Fusion/Tracker process and the Display process.

The invention may use several different types of interprocess communications, such as shared memory and a socket. The shared memory interprocess communication may use the four processes described above, while the socket may use up to six functions, as described above, to handle the communications to the data fusion/tracker. In one example, the shared memory communications handles a majority of the data between the processes while the socket passes the drop loop and drop track commands.

The Data Fusion/Tracker 52 may receive a "drop loop" message from either the Communications process or the Display process. If, at any time, an inductive loop sensor becomes inoperative or a sensor electronics becomes inoperative, that information must be passed to the Data Fusion/Tracker. The central computer thus periodically queries each sensor electronics to ensure that its loop is functioning. If a loop is not functioning, the sensor electronics sends a "bad loop" message to the central computer. The central computer then sends a "drop loop" message to the Data Fusion/Tracker. If the sensor electronics does not respond to the query, the central computer sends a "drop loop" message to the Data Fusion/Tracker.

The Display process, because of input from the operator, may send a "drop loop" message to the Data Fusion/Tracker. This may occur because of some change in the operating characteristics of the loop. If the detection signatures being received have changed significantly and the Classification process is incorrectly classifying aircraft, then it is best to delete that loop from further processing.

There are two methods by which a track may be dropped by the Data Fusion/Tracker. When either method is invoked, that track is dropped from further processing by the Data Fusion/Tracker. First, if an existing track is not updated for some set amount of time, the Data Fusion/Tracker will automatically delete the track. The time parameter is set in a parameter file and is editable. An automatic track deletion can occur because the airport is not fully loop instrumented. Therefore, aircraft and ground vehicles may enter and leave the loop-instrumented portion of the airfield at many points from other taxiways or runways which do not have inductive loop sensors installed. In order to not clutter the Display with tracks, these tracks are automatically deleted. Aircraft that have taken off have their tracks deleted automatically by the track update time-out feature described. Second, the operator has the option of dropping a track from the Data Fusion/Tracker process if the automatic track deletion time is longer than desired. This provides a method for the operator to clean up the displays.

The display is used for displaying tracks of aircraft and ground vehicles at the airport, such as Long Beach Airport. The display process may be implemented as a software application. The Display receives track information from the Data Fusion/Tracker by the shared memory interface between them and then displays updates to the track. Each track has its track number displayed next to it.

The data fusion/tracker may also include some incursion logic, which may be implemented in software within the central computer. This is embodied in the data fusion architecture of FIG. 10 as safety logic 169. The incursion logic may warn a tower air traffic controller when an unsafe condition exists on an airfield's runway or taxiway. An incursion has been defined by the Federal Aviation Administration (FAA) as any occurrence at a tower controlled airport involving an aircraft, vehicle, person or object on the ground of the airport which creates a collision hazard or results in the loss of separation with aircraft taking off or landing. The display system, as described above, may display a predetermined number of different alarms in, for example, an ascending order of priority and continue to display the alarm messages until the incursion conditions is disappeared, the alarm scrolls off the display due to high priority messages or the controller clears the alarm.

The alarm may be a warning message which blinks or caution messages which appears on the display in which a warning message is a higher priority concern than a caution message. For both warnings and cautions, an audible alarm may sound for some predetermined period of time, such as three seconds. For a caution alert, a single beep may sound.

The operator of the system may be able to customize the various warning and caution indicators, such as adjusting the volume or length of the audible signals.

In the incursion logic, each event which is detected may be classified into various priority levels in which warning messages have a higher priority than caution messages. Thus, for multiple events, the events are organized on the display based on the priority level associated with the event. For example, events in which there are two tracks (i.e., two different aircraft or vehicles) may have a higher priority than events in which there is only one track (i.e., an event involving only a single aircraft or vehicle). As another example, an event in which two aircraft are approaching each other (i.e., a closing geometry) may be given higher priority than an event in which two aircraft are moving away from other each (i.e., a opening geometry). As another example, events involving departing, arriving and/or landing aircraft are given priority over events involving taxiing and/or stopped aircraft.

The incursion logic may detect various different events/incursions which may include, but is not limited to: 1) head-on traffic in which two aircraft are moving towards each other in opposite directions; 2) opposite direction departure/landing in which an aircraft is moving down a runway in an opposite direction to the expected direction; 3) multiple departures in which a departing aircraft is following too closely to another aircraft departing on the same runway; 4) departures on an occupied runway in which an aircraft is supposed to depart on a runway which is already occupied by another aircraft which may be stopped overhanging the runway, landing or taxiing; 5) the departure runway is occupied by an aircraft which is stopped; 6) two aircraft on crossing runways where the aircraft may enter a runway intersection at the same time; 7) two aircraft are taxiing in the opposite direction on the same taxiway in which one aircraft does not have an exit from the taxiway; 8) an aircraft arrival on an occupied runway; 9) head-on traffic in which one aircraft is arriving and the other aircraft is moving towards the arriving aircraft; and 10) with a loop sensor properly located, an alert may be given if an aircraft or ground vehicle enters an area of the airport they are not allowed to enter. Now, an example of the track symbol for a small aircraft, its track number and its signature analysis window are described.

Figure 11:
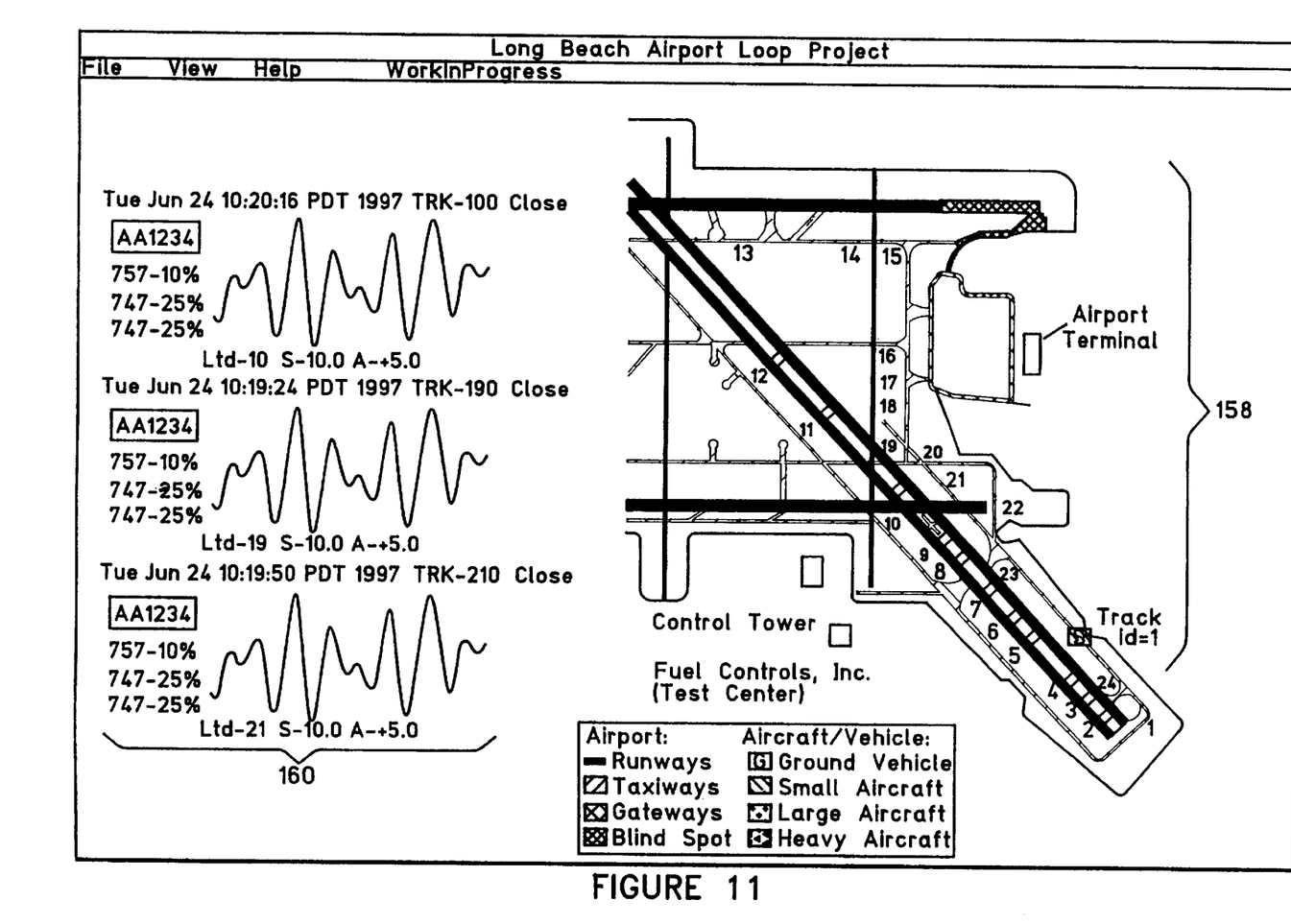
FIG. 11 is a diagram illustrating an example of the displayed tracking in accordance with the invention.

FIG. 11 shows an example of a track symbol for a small aircraft, its track number, and signature analysis window. The track and aircraft information 158 can be displayed by operator selection of various options. The signatures of aircraft or ground vehicles passing over any loop may be called up to the Display for examination and comparison to their signature from other loops. A signature window 160 contains information about that detection and associated track information. The information displayed about the loop detection includes the loop, number of the detection, aircraft classification, confidence in that classification, speed, and course.

The operator has the option of deleting a loop or track from further processing. The Display process, because of input from the operator, may send a "drop loop" message to the Data Fusion/Tracker. This may occur because of some change in the operating characteristics of the loop. If the detection signatures being received have changed significantly and the Classification process is incorrectly classifying aircraft, then it is best to delete that loop from further processing. When the operator selects a track to be dropped from the Display, a message is sent to the Data Fusion/Tracker. The Data Fusion/Tracker process then drops that track from further processing.

The detection data may be stored in a database and then queried based on various different criteria. The detection data may be extracted by date, aircraft type, flight number, tail number, and tag number. For example, various scenarios may be created by extracting signatures for a particular aircraft for a specific day. These scenarios may be created for classification and tracking analysis purposes or for demonstrations. The scenarios created in this manner are processed through the Data Fusion/Tracker and the Display. They will also be processed by the Classifier running on the central computer, since there is no method of feeding the archived signature and detection data back through a sensor electronics. This is the method used for classifier training and performance evaluation. Additional analysis may be performed to identify individual loop differences and characterize signature differences by loop size. Another use for the archived data is to perform signature analysis of the same aircraft over time in an attempt to identify and characterize any changes in the loop or aging of electronics over time.

The system may also include performance analysis systems. The performance analysis measures how accurately the system performs. A number of metrics have been defined to measure this performance. The metrics are divided into two classes: detection and classification metrics and tracker metrics. An example of these metrics are described below.

Detection and Classification Metrics

1. Correct classification: This metric measures how well the classifier is able to classify an aircraft according to size—small, large, or heavy—by comparing the total number of correctly classified aircraft to the number of aircraft that were available for classification. This number includes those aircraft that were not classified. The number and percentage of correct classification will be reported.

2. Incorrect classification: This metric measures how poorly the classifier performs according to aircraft size—small, large, or heavy —by comparing the total number of aircraft incorrectly classified to the number of aircraft that were available for classification. The number available for classification includes those aircraft that were not classified. This number is the inverse of metric 1, above, less those aircraft not classified. The number and percentage of incorrect classification will be reported.

3. Not classified: This metric measures the number of aircraft that the classifier was unable to classify by comparing the total number of aircraft not classified to the number of aircraft that were available for classification. The number available for classification includes those aircraft that were not classified. The number and percentage of aircraft not classified or not classified will be reported.

4. Loop crossings to correctly classify: This metric measures how quickly the classifier is able to correctly classify an aircraft by measuring how many loops an aircraft must pass over before it is correctly classified. The mean and standard deviation of the number of loops it takes to correctly classify an aircraft will be reported. Those aircraft not correctly classified will be excluded in this metric.

5. Correct classification by specific aircraft type: This metric measures how well the classifier is able to classify an aircraft according to type by comparing the total number of aircraft correctly classified to the number of aircraft that were available for classification. The number available for classification includes those aircraft that were not classified. The number and percentage of correct classification by specific aircraft type will be reported.

6. Incorrect classification by specific aircraft type: This metric measures how poorly the classifier performed according to aircraft type by comparing the total number of aircraft incorrectly classified to the number of aircraft that were available for classification. The number available for classification includes those aircraft that were not classified. This number is the inverse of metric 5 above, less those aircraft not classified. The number and percentage of incorrect classification by specific aircraft type will be reported.

7. Speed estimate correctness: This metric measures how well the system is able to estimate aircraft speed. The metric is reported as a mean difference from actual speed and standard deviation.

Tracker Metrics

1. Number of loop detections for the track to get to the display: This metric reports how many loop detections it takes on average for an aircraft track to be displayed. The mean and standard deviation will be reported.

2. Probability of correct classification (Pcc) for first loop versus current loop detection: This metric is used as an indication of how the number of loops an aircraft passes over affects the improvement of correct classification. This metric will be reported as a table indicating the mean and standard deviation of improvement from the first loop to the second loop, the first loop to the third loop, the first loop to the fourth loop, etc.

3. Tracker-predicted loop detection time of an aircraft versus actual detection time: This metric is generated by the Data Fusion/Tracker, which predicts for every track the expected arrival time at the next loop. This metric reports the mean and standard deviation of the difference between estimated loop arrival time and actual loop detection time as reported by the IVS-2000.

4. False tracks: This metric reports the number and percentage of tracks that were incorrectly formed by the Data Fusion/Tracker.

5. Missed tracks: This metric reports the number and percentage of detections that did not get sent to the Data Fusion/Tracker.

As described above, detection scenarios for analysis may be generated by selecting a series of aircraft by tag number or tail number for a given day from the database. These scenarios are processed through the Data Fusion/Tracker and performance statistics are collected. These statistics are used to identify classification problems and tracker deficiencies. If classification problems are encountered, additional classifier training may be indicated or an increase in the number of standard deviations allowed about the mean for any signature vector may be required.

Three demonstration modes offering different levels of operator interaction and control are available. For the real-time processing mode and the database-generated scenarios type of demonstration, the operator has the ability to delete loops and tracks from the display, causing further processing of the deleted loops and tracks to stop. For the tracker output file processing, no operator interaction is allowed. This is a pure playback mode only.

The real-time processing demonstration mode uses the software described above. The sensor electronics collect data and these detection data are sent to the central computer. The Data Fusion/Tracker process generates and updates tracks based on aircraft or ground vehicle detection data received from the sensor electronics. These tracks are sent to the Display where they are viewed. Full operator control of loop and track deletions is available in this demonstration mode.

Using detection scenarios created from the database of aircraft signatures, a demonstration of any length may be created. This data is read by an input process that replaces the Communications process and sends detection data to the Data Fusion/Tracker process. The Data Fusion/Tracker process generates and updates tracks based on aircraft or ground vehicle detection data received from the scenario. These tracks are sent to the Display where they are viewed. Full operator control of loop and track deletions is available in this demonstration mode.

For the tracker output file processing demonstration, the Display process receives data from a program that reads a saved tracker output file. For this demonstration mode, no display operator interaction is available. It just displays those tracks that were previously generated by the Data Fusion/Tracker.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A system for classifying and tracking traffic in an airport having at least one runway and at least one taxiway, the system comprising:

one or more inductive loops positioned at predetermined locations near the runway and the taxiway to generate a signal when a vehicle passes near an inductive loop;

means for assigning a classification to the vehicle in response to the signal generated by the inductive loop;

means for determining a position of the vehicle in the airport as the vehicle passes near the inductive loop;

means for calculating the speed of the vehicle as the vehicle passes over the inductive loop; and means for displaying a representation of the vehicle in the airport, the representation of the vehicle indicating the classification of the vehicle, the position of the vehicle, and the speed of the vehicle.

2. The system of claim 1, wherein each inductive loop is located underneath the runway or the taxiway.

3. The system of claim 2, wherein the inductive loops are embedded in material used to make the runway or taxiway.

4. The system of claim 1, wherein said display means comprises means for generating and displaying a departure queue.

5. The system of claim 1 further comprising electronics coupled to the one or more inductive loops located in a waterproof housing near the runway and taxiway.

6. The system of claim 5, wherein the electronics further comprise a detector for detecting the crossing of an inductive loop and generating a detection signal, a classifier for selecting an identification of the vehicle from a predetermined number of vehicle signatures based on the detected signal, means for estimating the speed of the vehicle based on the detected signal, and means for communicating information about the vehicle to a remote central computer.

7. The system of claim 6, wherein the classifier comprises a neural network.

8. The system of claim 1 further comprising means for tracking data to determine if the signal matches already existing signals.

9. The system of claim 8 further comprising a data base of known signature values and means for comparing incoming signals to the database to determine if the incoming signal relates to the same vehicle.

10. The system of claim 9 further comprising means for generating an indication of the movement of the vehicle around the airport based on the signal to generate a track for the vehicle.

11. The system of claim 10 further comprising means for fusing the track of the signal to an existing track if the incoming signal matches a signature of an already existing track.

12. The system of claim 1 further comprising a database containing aircraft tag entry information to match the incoming signal to a flight number.

13. The system of claim 1 further comprising means for sensing a vehicle stopped over the inductive loop.

14. The system of claim 1, wherein said vehicle comprises an aircraft.

15. The system of claim 1, wherein said vehicle comprises a ground transportation vehicle.

16. The system of claim 1 further comprising means for determining an incursion between two vehicles on the grounds of the airport based on the signal for each vehicle.

17. A system for classifying and tracking vehicles on the grounds of an airport, the airport having at least one runway and at least one taxiway, the system comprising:

means for generating a signal corresponding to a vehicle on the grounds of the airport passing over an inductive loop;

means for generating a signature and an incoming track for the vehicle based on the signal;

means for comparing the signature to the signatures of previous signals to identify matching signatures; and means for combining the track of the vehicle with a track of a previous signal when matching signatures are identified so that the movement of the vehicle over the grounds of the airport is tracked.

* * * * *

UNITED STATES PATENT AND TRADEMARK OFFICE
CERTIFICATE OF CORRECTION

PATENT NO.     : 6,462,697 B1
DATED          : October 8, 2002
INVENTOR(S)    : Klamer et al It is certified that error appears in the above-identified patent and that said Letters Patent is hereby corrected as shown below:

<u>Title page,</u>
Item [54], change "SYSTEM AND METHOD FOR CLASSIFYING AND TRACKING AIRCRAFT VEHICLES ON THE GROUNDS OF AN AIRPORT" to -- SYSTEM AND METHOD FOR CLASSIFYING AND TRACKING AIRCRAFT AND VEHICLES ON THE GROUNDS OF AN AIRPORT --

Signed and Sealed this

Fourth Day of February, 2003

JAMES E. ROGAN
*Director of the United States Patent and Trademark Office*